United States Patent

[11] 3,577,072

| [72] | Inventor | Arthur Miller |
| | | Chestnut Hill, Mass. |
| [21] | Appl. No. | 777,033 |
| [22] | Filed | Nov. 19, 1968 |
| [45] | Patented | May 4, 1971 |
| [73] | Assignee | Hewlett-Packard Company |
| | | Palo Alto, Calif. |

[54] BRIDGE CIRCUIT FOR DIFFERENTIALLY MEASURING CAPACITANCE
6 Claims, 1 Drawing Fig.

[52] U.S. Cl. .................................................... 324/60C, 324/57R
[51] Int. Cl. ..................................................... G01r 27/26, G01r 27/00
[50] Field of Search ........................................... 324/60, 60 (A), 60 (B), 60 (C), 57; 323/75 (E), 75 (G); 317/246

[56] References Cited
UNITED STATES PATENTS
3,012,192  12/1961  Lion ............................. 324/60X Primary Examiner—Rudolph V. Rolinec
Assistant Examiner—Ernest F. Karlsen
Attorney—Stephen P. Fox ABSTRACT: An AC bridge includes two variable capacitors and two complementary conductivity transistors. The two transistors conduct during opposite one-half cycles of the AC bridge excitation voltage to alternately couple the two capacitors in circuit with a load resistor. When either one of the capacitors is not coupled to the load, it is clamped to a source of reference potential by a diode. The output across the load is proportional to the difference in value between the two capacitors.

PATENTED MAY 4 1971
3,577,072
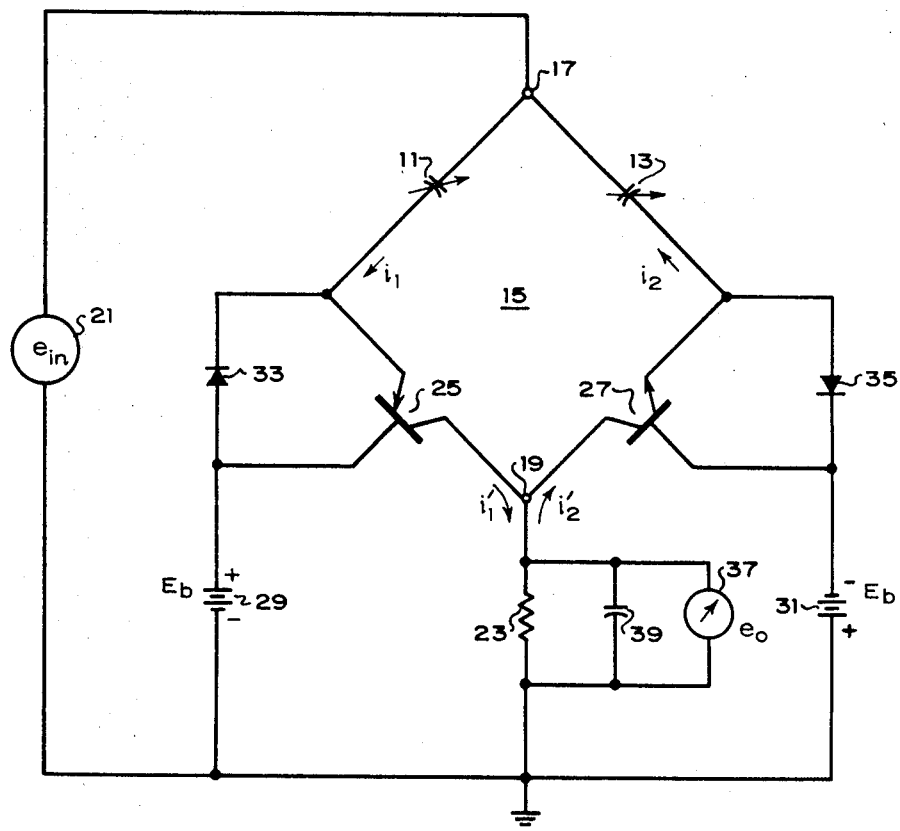
INVENTOR
ARTHUR MILLER
BY *Stephen P. Fox*
AGENT

BRIDGE CIRCUIT FOR DIFFERENTIALLY MEASURING CAPACITANCE

BACKGROUND OF THE INVENTION

Variable reactance elements such as capacitors may be used as transducers for measuring physical displacement. Typically, two variable capacitors are incorporated into two of the four arms of an AC bridge, and the capacitors are alternately connected in circuit with an output device for indicating the difference in value between them. Prior-art AC bridges used for this purpose generally employ a plurality of passive components such as diodes and resistors. Such circuit configurations have the disadvantages that the output voltage is proportional to capacitance change only within a limited output voltage swing, and/or the characteristics of the diodes in different arms of the bridge must be carefully matched in order to maintain proper bridge balance. Another disadvantage of many prior-art AC bridges having a small signal output characteristic is that the effect of any stray or leakage capacitance may be undesirably magnified in the output.

SUMMARY OF THE INVENTION

The aforementioned disadvantages are obviated by the present invention, which in the illustrated embodiment includes a bridge circuit having two pairs of arms connected between an AC excitation source and a load resistance. The arms of each pair respectively include a variable capacitor and a transistor. The transistors conduct during alternate one-half cycles of the AC source to provide a current path through one or the other of the capacitors to the load. The output across the load is proportional to the difference in capacitance between the variable capacitors in the two pairs of arms.

The nonconducting one of the transistors isolates its corresponding capacitor from the load. Simultaneously, the isolated capacitor is clamped to a source of reference potential by a diode. Thus this capacitor does not affect current flowing through the other capacitor to the load.

The transistors used have a high current gain so that the emitter and collector currents are nearly equal. Thus, the load current supplied from the collector electrodes is not sensitive to variations in the transistor parameters due to the adverse effects of time or temperature, and the transistors in the two pairs of arms do not have to be matched. Additionally, the transistors and clamping diodes operate with a very low impedance to ground so that even relatively large stray or leakage capacitances have little effect on the bridge circuit.

BRIEF DESCRIPTION OF THE DRAWING

The single FIGURE of the drawing is a schematic diagram of the preferred embodiment of the present invention.

DESCRIPTION OF THE PREFERRED EMBODIMENT

Referring now to the FIGURE, there is shown a circuit for determining the difference in capacitance between two variable capacitors 11 and 13. These two capacitors are in a bridge circuit 15 having two pairs of adjacent arms connected in parallel between an input terminal 17 and output terminal 19. An excitation voltage $e_{in}$ is provided by an AC source 21 and applied to the input terminal 17. The output terminal 19 is connected to a load resistor 23 which is referenced to ground.

The adjacent arms of one of the pairs respectively contain the capacitor 11 and a PNP-type transistor 25. The adjacent arms of the other pair respectively contain the capacitor 13 and an NPN-type transistor 27. The collector-base junctions of the two complementary transistors 25, 27 are appropriately biased by potential sources 29, 31 each of which produces a bias voltage $E_b$.

The two transistors 25, 27 conduct on alternate half cycles of the current which flows substantially 90° out of phase with the excitation voltage $e_{in}$. A diode 33 connected to the junction point of capacitor 11 and transistor 25 serves to clamp capacitor 11 to the constant potential source 29 during the positive half cycle of the input current. Similarly, a clamping diode 35 effectively grounds capacitor 13 during the negative half cycle of the voltage $e_{in}$. The constant potentials $E_b$ of sources 29, 31 act as virtual grounds for the AC circuitry, as hereinafter described.

During the positive half cycle of the current, designated $i_1$ in the FIGURE, transistor 25 is forward biased and capacitor 11 charges through transistor 25 and load resistor 23. At this time, transistor 27 is reverse biased into nonconduction and diode 35 diverts current in capacitor 13 to ground through source 31. Therefore the load resistor 23 is substantially isolated from the effects of current through capacitor 13. Conversely, on the negative half cycle of the current from source 21, designated $i_2$ in the FIGURE, transistor 27 and diode 33 conduct, and transistor 25 and diode 35 do not conduct. Therefore, capacitor 13 is charged through the load resistor 23 and transistor 27 and capacitor 11 is grounded through source 29.

The amplification factors of transistors 25, 27 are high, typically on the order of 100 or more, so the collector current is very nearly equal to the emitter current and substantially all of the current which flows through one or the other of capacitors 11, 13 also flows through load resistor 23. In the FIGURE, $i_1 \cong i'_1$ and $i_2 \cong i'_2$, and the magnitudes of the collector currents $i'_1$ and $i'_2$ are not affected by the value of the load resistor 23.

The excitation voltage $e_{in}$ is the sum of the voltage drop across a bridge capacitor, for example capacitor 11, and the voltage drop across the base-emitter junction of its associated transistor 25, when conducting. The frequency of the AC source 21 is low so that the transistor is essentially resistive and its base-emitter voltage drop is in phase with the current $i_1$. However, the voltage drop across the capacitor 11 is in quadrature with this current. The peak value of the base-emitter voltage is about 0.6 volt, so that if $e_{in}$ is large relative thereto, for example 6 volts or more, the quadrature relationship results in the voltage across capacitor 11 being substantially equal in magnitude to $e_{in}$. As noted above, the value of the load resistor 23 does not affect the bridge current. Therefore, the mathematical expressions for the average values of currents $i'_1$ and $i'_2$ over successive positive and negative half cycles of a sine wave AC input voltage $e_{in}$ are as follows:

$$i'_1 = \frac{1}{\pi}(E_p \cdot 2\pi f C_1) = 2E_p f C_1 \qquad (1)$$

$$i'_2 = -\frac{1}{\pi}(E_p \cdot 2\pi f C_2) = -2E_p f C_2 \qquad (2)$$

where $E_p$ is the peak value of the excitation voltage $e_{in}$, $f$ is the frequency of the AC source 21, and $C_1$ and $C_2$ are the values of the capacitors 11, 13.

The total average current through load resistor 23 is the sum of $i'_1$ and $i'_2$, which are represented by the right-hand terms of equations (1) and (2). This sum is as follows:

$$i'_1 + i'_2 = 2E_p f(C_1 a/C_2) = 2E_p f \Delta c \qquad (3)$$

where $\Delta c$ is the difference in capacitance between the two capacitors 11 and 13.

The total current represented by the right-hand term of equation (3) produces a DC output voltage across the load resistor 23 which may be expressed as follows:

$$e_o = 2E_p f R_L \Delta c \qquad (4)$$

where $R_L$ is the value of the load resistance 23.

It can be seen that the output voltage is directly proportional to the difference in capacitance $\Delta c$. This difference may be indicated by suitable measuring means such as a meter 37, as shown in the FIGURE. A filter capacitor 39 may also be connected across resistor 23 without adversely affecting the bridge operation because of the isolating effect of transistors 25, 27.

The output voltage $e_o$ is independent of the forward voltage drops of diodes 33, 35 so it is not required that these diodes have matched temperature and time variation characteristics. The output voltage $e_o$ is limited only by the magnitude $E_b$ of the bias voltage sources 29, 31, and the maximum value of $e_o$ for a linear output is large if $E_b$ is large. The output voltage $e_o$ is an accurate representation of the difference $\Delta c$ between capacitors 11 and 13 even if there are small differences in component parameters which cause slightly asymmetrical operation of the two pairs of arms of the bridge 15.

I claim:

1. A circuit for providing an output proportional to the difference between two variable reactance elements comprising:
   a bridge including:
      input terminal means connectable to an AC excitation voltage source;
      output terminal means connectable to a load;
      two parallel pairs of adjacent arms,
         each of said pairs being connected between said input and output terminal means,
         one arm of each pair including one of said two variable reactance elements, and
         the other adjacent arm of each pair including a transistor;
   means for biasing the transistors in said two pairs of adjacent arms to conduct alternately during successive half cycles of said AC signal source;
   a source of reference potential;
   means for clamping the reactance element in either pair of adjacent arms to said source of reference potential during the one-half cycle of said AC signal when the transistor in the other pair of adjacent arms is conducting.

2. The circuit of claim 1,
   each pair of adjacent arms being connected together at a common junction point,
   said transistors being of complementary conductivity-type and each of said transistors having an emitter electrode connected to the corresponding one of said common junction points, a collector electrode connected to said output terminal means, and a base electrode connected to said biasing means.

3. The circuit of claim 2,
   said biasing means including two opposite polarity DC voltage sources connected respectively to the base electrodes of said complementary conductivity transistors; and
   said clamping means including oppositely poled diodes connected respectively to said common junction points.

4. The circuit of claim 2, wherein each of said two variable reactance elements is a variable capacitor.

5. The circuit of claim 4, further including:
   load resistance means connected to said output terminals means; and
   means for measuring the output voltage developed across said load resistance means, said output voltage being indicative of the difference in capacitance between said variable capacitors.

6. The circuit of claim 5, further including filter capacitor means connected in parallel with said load resistance means.

UNITED STATES PATENT OFFICE
CERTIFICATE OF CORRECTION

Patent No. 3,577,072　　　　　　　　Dated May 4, 1971

Inventor(s) Arthur Miller

It is certified that error appears in the above-identified patent and that said Letters Patent are hereby corrected as shown below:

Column 2, line 56, $$"i'_1 + i' = 2E_p f(C_1 a l C_2) = 2E_p f \triangle c \qquad (3)"$$

should read $$-- i'_1 + i'_2 = 2E_p f(C_1 - C_2) = 2E_p f \triangle c \qquad (3) --$$

Signed and sealed this 31st day of August 1971.

(SEAL)
Attest:

EDWARD M. FLETCHER, JR.　　　　　ROBERT GOTTSCHALK
Attesting Officer　　　　　　　　　Acting Commissioner of Pa